July 21, 1936.  E. H. SOUTH  2,048,575
RESILIENT WHEEL FOR VEHICLES
Filed March 20, 1935  2 Sheets-Sheet 1
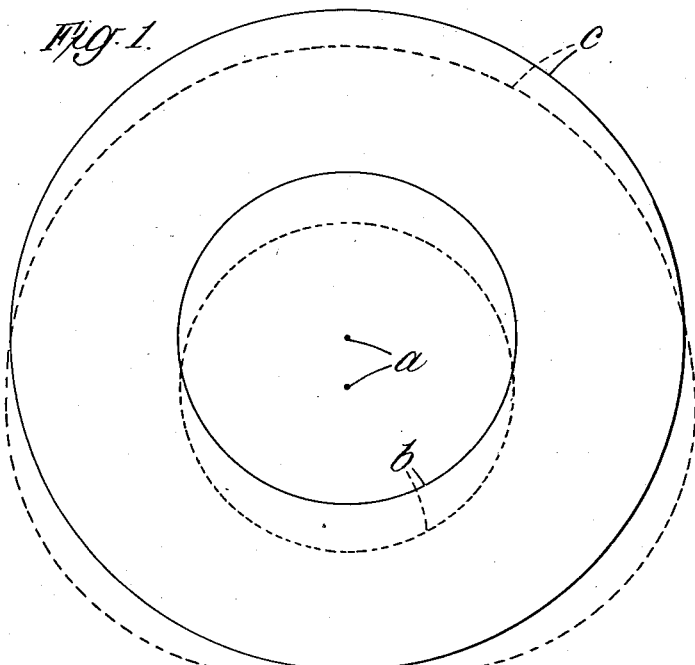
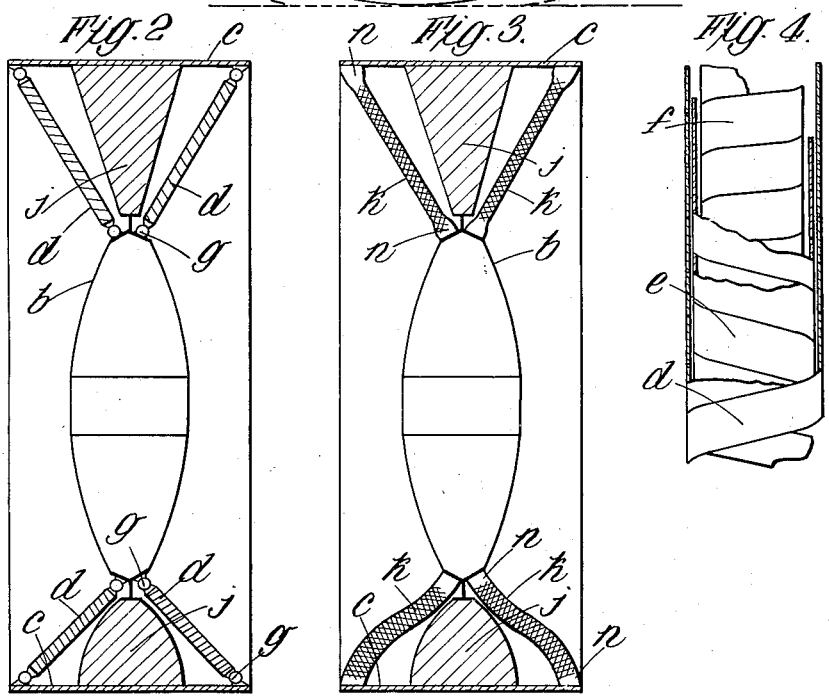
Inventor
Ernest Hamilton South
By Bailey & Carson
Attorneys July 21, 1936. E. H. SOUTH 2,048,575
RESILIENT WHEEL FOR VEHICLES
Filed March 20, 1935 2 Sheets-Sheet 2
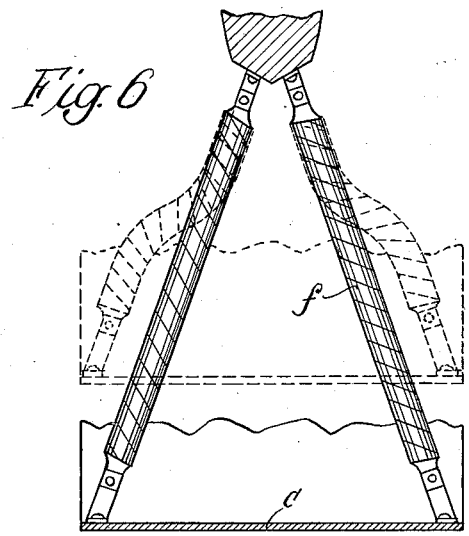
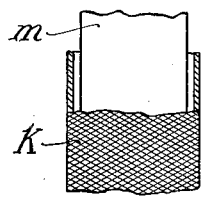
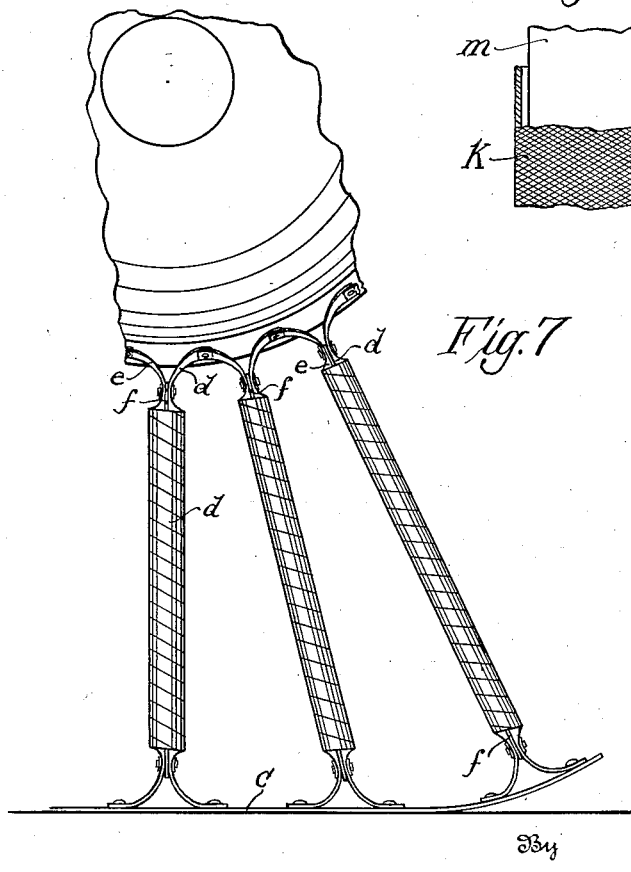
Inventor
Ernest Hamilton South Patented July 21, 1936

2,048,575

UNITED STATES PATENT OFFICE 2,048,575

RESILIENT WHEEL FOR VEHICLES

Ernest Hamilton South, Salisbury, Southern Rhodesia

Application March 20, 1935, Serial No. 12,093
In Great Britain August 2, 1933

6 Claims. (Cl. 152—29)

This invention relates to resilient wheels for vehicles, of the kind in which a resilient outer suspension ring or annulus is connected with an inner rigid rim or the like of less diameter which is concentric therewith when the wheel is unloaded by means which will permit the resilient ring to approach the rigid rim, where it is subject to external pressure, but is adapted to resist movement of the resilient rim away from said rigid rim.

According to the invention a resilient wheel of the kind set forth comprises a hub, a flexible substantially inextensible tread band and a plurality of spokes connecting said hub and band wherein said spokes consist of two or more tubular members, the extension of which is limited by the binding of an outer tubular member upon an inner tubular member.

Preferably these spokes are flexibly connected at their ends with the hub and band respectively, for example, by interposed blocks of India rubber (which may be suitably reinforced) vulcanized thereto or by means of ball and socket joints which may be suitably jacketted or sealed to exclude grit and to retain lubricant, or by means of strips diverging from the spokes to the band.

Each spoke is preferably constructed of two layers of spring steel ribbon wound helically at a steep angle, and in opposite directions, one layer closely surrounding the other which encloses a third layer which is similar but wound at a small angle and spaced within the second layer (depending upon the degree of extension required). The ends of these three coils are secured both to the hub and band, for example, by extensions of said coils constituting the divergent strips mentioned above, and the arrangement is such that when a spoke is caused to extend, the outer layers decrease in diameter at a greater rate than the third layer and ultimately bind thereon and prevent further appreciable extension. At that part of the wheel, when loaded, where the band is caused to approach the hub, the inherent contracting quality of the spokes reduces their length.

Alternatively, the spokes may be constructed of layers of woven plaited or braided spring wire, and if desired, a core of India rubber may be disposed within said layers of braided wire.

The spokes are preferably covered, for example with India rubber, and may be secured to the hub in or near its central plane and splay outwards in two series towards the edges of the flexible band and if desired a third series consisting of compression springs may be arranged in said central plane or alternatively an annulus of cellular rubber of approximately triangular section may replace said third series. This serves to increase the pressure at the centre of the tread and is particularly useful when the wheel passes across a high narrow obstacle such as a high rail when the centre of the rim is caused to assume an inverse curvature.

In the accompanying diagrammatic drawings Figure 1 illustrates the deformation of the wheel under load. Figures 2 and 3 illustrate in cross-section two forms of wheel according to the invention, and Figures 4 and 5 are enlarged views of two forms of spokes parts being broken away for the sake of clearness, while Figs. 6 and 7 show the securement of the individual layers of the spring steel ribbon to the hub and the tread band.

In Figure 1 $a$ is the centre of the hub $b$ and $c$ is the flexible band, their relative positions when free and when under load being shown in full and broken lines respectively.

Figure 2 shows a loaded wheel with spokes constituted by helically wound strips of spring steel ribbon. Each spoke is constructed of two layers $d$ and $e$ of spring steel ribbon wound helically at a suitable angle, and in opposite directions, the one layer $d$ closely surrounding the other $e$ which encloses a third layer $f$ which is preferably stouter and is wound at a smaller angle and spaced within the layer $e$ to an extent depending upon the degree of extension required. The ends of these three coils $d$, $e$ and $f$ are flexibly secured both to the hub $b$ near the medium plane of the wheel, and to the flexible band $c$ near its edges by ball and socket joints $g$ . . . and the arrangement is such that when a spoke is caused to extend (as at the upper part of Figure 2) the outer layers $d$ and $e$ decrease in diameter at a greater rate than the layer $f$ and ultimately bind thereon and prevent further appreciable extension. At that part of the wheel, when loaded, where the band $c$ is caused to approach the hub $b$, as shown at the lower part of Figures 1 and 2, the inherent contracting quality of the spokes reduces their length.

If desired, the ends of the spring steel ribbon constituting the layers $d$, $e$ and $f$, may be spread out and secured, for example, by rivets, to the band $c$. As shown in Figs. 6 and 7, the two outer layers or helixes $d$ and $e$ are bent in opposite directions while the central layer $f$ has its ends cut short and fastened to the two outer layers by means of the bolts or the like.

The spokes may be covered with India rubber and an annulus $j$ of cellular rubber of approximately triangular section is arranged between the splayed spokes; this annulus $j$ is shown expanded at the upper part of Figure 2 and compressed at the lower part thereof, while the spokes are shown extended and contracted correspondingly. The annulus $j$ may be replaced by a series of compression springs of approximately triangular section.

Figures 3 and 5 show a similar arrangement except that the spokes instead of being constructed of layers of helically wound steel ribbon are constituted by a layer $k$ of braided spring wire or the like, which may in some cases be disposed outside a core $m$ of India rubber, whilst the ends of the spokes are connected with the hub $b$ and rim $c$ by blocks $n$ (Figure 3) of India rubber vulcanized to said parts. If there be no core $m$ provided then the extension of the spoke is limited by the binding of the strands of the layer $k$ having a right hand twist upon those having a left hand twist while, if the core $m$ be provided the extension is limited by the contraction of the layer $k$ onto said core $m$.

The wheel of this invention is very resilient, has good shock absorbing properties and a low impact value, whilst its width in conjunction with its deformable qualities give a large contact area with the ground.

I claim:—

1. A resilient wheel comprising a hub, a flexible resilient substantially inextensible tread band and a plurality of spokes connecting said hub and band, each of said spokes consisting of at least two resilient members being normally spaced apart, the extension of said members being limited by the binding of one member upon the other.

2. A resilient wheel comprising a hub, a flexible resilient substantially inextensible tread band and a plurality of spokes flexibly connected at their ends with said hub and said band, each of said spokes consisting of at least two differentially contractible resilient tubular members being normally spaced apart, the extension of said members being limited by the binding of an outer member upon an inner member.

3. A resilient wheel comprising a hub, a flexible resilient substantially inextensible tread band and a plurality of spokes connecting said hub and said band, each of said spokes having three coaxially arranged tubular members, each of said members consisting of a layer of spring steel ribbon, the layers of the two outer tubular members being wound helically in opposite directions, the layer of the innermost tubular member being wound helically at a smaller angle than the layers of the two outer members.

4. A resilient wheel comprising a hub, a flexible resilient substantially inextensible tread band, a plurality of spokes connecting said hub and said band, said spokes splaying outward in two series from said hub toward the edges of said band, and a resilient annular member between said series connected with said hub and said band, each of said spokes having at least two differentially contractible resilient tubular members, said members being coaxially arranged, the extension of said members being limited by the binding of an outer tubular member upon an inner tubular member.

5. A resilient wheel comprising a hub, a flexible resilient substantially inextensible tread band, a plurality of spokes connecting said hub and said band, said spokes splaying outward in two series toward the edges of said band, and resilient means between said series connected with said hub and said band, each of said spokes having at least two differentially contractible resilient tubular members, said members being coaxially arranged, the extension of said members being limited by the binding of an outer member upon an inner member.

6. A resilient wheel comprising a hub, a flexible resilient substantially inextensible tread band and a plurality of spokes connecting said hub and band, each of said spokes consisting of a tubular member of braided spring wire and a rubber member disposed within said tubular member and normally spaced therefrom, the extension of said members being limited by the binding of the tubular member upon the rubber member.

ERNEST HAMILTON SOUTH.